J. C. KING.
Cotton Seed Planter.
No. 109,222. Patented Nov. 15, 1870.
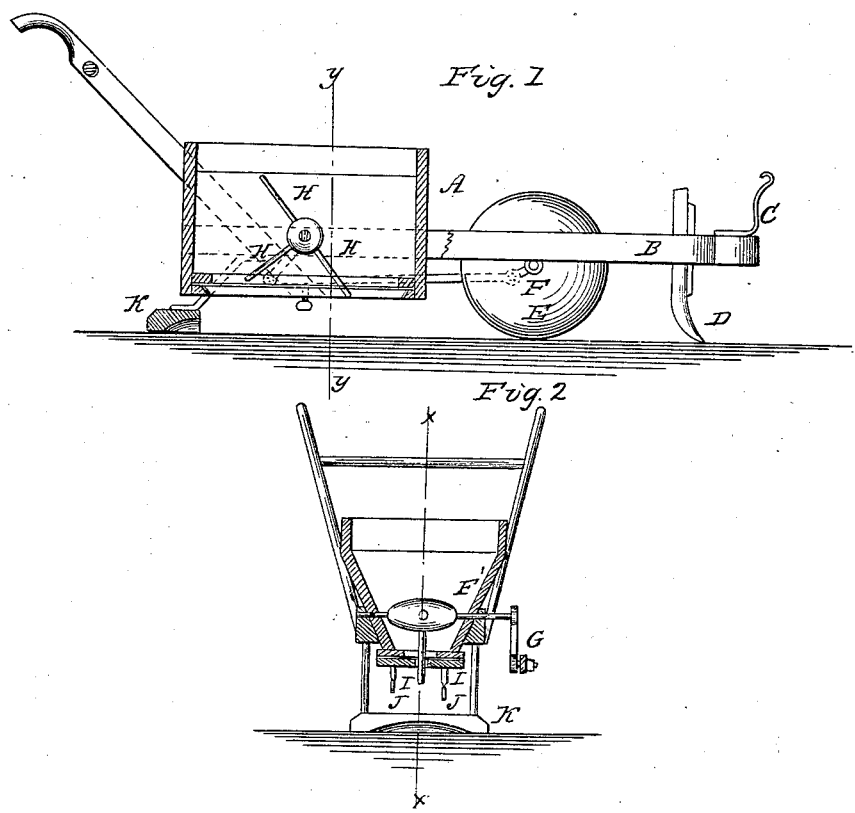

United States Patent Office.

JOHN C. KING, OF SPRING PLACE, GEORGIA.

Letters Patent No. 109,222, dated November 15, 1870.

IMPROVEMENT IN COTTON-SEED PLANTERS.

The Schedule referred to in these Letters Patent and making part of the same.

*To all whom it may concern:*

Be it known that I, JOHN C. KING, of Spring Place, in the county of Murray and State of Georgia, have invented a new and useful Improvement in Cotton-seed Planter; and I do hereby declare that the following is a full, clear, and exact description thereof, which will enable others skilled in the art to make and use the same, reference being had to the accompanying drawing forming part of this specification.

My invention relates to cotton-seed planters; and consists in certain improvements on the means for distributing the seed, which will be clearly specified in the claim.

In the accompaying drawing—

Figure 1 represents a vertical longitudinal section of the implement on the line $xx$ of fig. 2.

Figure 2 is a vertical cross-section of fig. 1 on the line $y\ y$.

Similar letters of reference indicate corresponding parts.

A is the box in which the seed to be planted is placed.

This box is supported on a forked frame, B.

The side pieces of this frame are connected at their front ends, and spread at their rear ends.

The horse is attached to the hook C.

D is a cultivator-tooth, for forming the furrow.

E is a wheel, revolving in the furrow, to the shaft of which a crank, F, is attached, which is connected to a rock-shaft, F', which passes through the box A, by an arm, G.

Longitudinally through the bottom of the box a slot is made, through which the seed drops into the furrow.

The seed in the box is agitated or prevented from clogging by arms H, more or less in number, in the rock-shaft F', and the size of the slot in the bottom of the box is governed by slides I I, which are held in position by thumb-screws J J.

As the wheel E revolves the shaft F' is rocked back and forth by the revolution of the crank F, and this movement carries the arms H, one or more of them, through or into the slot in the box, and keeps the seed stirred up so that it cannot clog, but so that it is evenly distributed in the furrow.

K is a block attached to the seed-box, the bottom side of which is hollowed out, as seen in the drawing, so that the earth on the sides of the furrow is scooped toward the center, and the seed is covered and the ground leveled off as the machine moves along, the whole operation of planting being completed by one operation.

By substituting a rake for the coverer K, guano, or other fine fertilizers may be uniformly mixed with the soil.

L is the rod which connects the crank F with the arms G of the rock-shaft.

This rod is made adjustable by means of rods and pins at both ends, so that the throw of the arms H may be increased or diminished, as may be desired.

Having thus described my invention,

I claim as new and desire to secure by Letters Patent—

The arrangement, in the seed-box A and on a vibrating shaft, F, of stirring-arms H, so as to pass through the aperture in the bottom of the seed-box, and through the adjustable slides I I, as and for the purpose described.

JOHN C. KING.

Witnesses:
S. G. CARTER,
JAMES A. SEWELL.